United States Patent [19]
Semhere

[11] Patent Number: 6,068,795
[45] Date of Patent: May 30, 2000

[54] PROCESS AND PRODUCT FOR PROVIDING FIRE RESISTANCE AND ACOUSTIC AND THERMAL INSULATION

[76] Inventor: Hilal Semhere, 27242 Strawberry La., #103, Farmington Hills, Mich. 48334

[21] Appl. No.: 08/986,914

[22] Filed: Dec. 8, 1997

[51] Int. Cl.[7] .............................. C09K 21/02; E04B 1/88
[52] U.S. Cl. ...................... 252/602; 106/18.12; 106/601; 106/605; 252/62; 252/606; 264/42
[58] Field of Search ............................ 252/606, 62, 202; 106/18.12, 605, 601; 264/42

[56] References Cited

U.S. PATENT DOCUMENTS

| | | | |
|---|---|---|---|
| 2,821,514 | 1/1958 | Sarbach et al. | 524/424 |
| 3,450,547 | 6/1969 | Sams et al. | 252/62 X |
| 3,629,116 | 12/1971 | Gartner et al. | 252/62 |
| 3,707,385 | 12/1972 | Kraemer et al. | 106/18.12 X |
| 4,041,000 | 8/1977 | Farcnik | 524/432 |
| 4,273,879 | 6/1981 | Langer et al. | 521/91 |
| 4,394,337 | 7/1983 | Kummermehr | 252/62 X |
| 4,443,258 | 4/1984 | Kirkhuff | 106/18.12 |
| 4,533,393 | 8/1985 | Neuschaeffer et al. | 106/18.12 |
| 4,584,281 | 4/1986 | Foley | 106/601 X |
| 4,720,414 | 1/1988 | Burga | 428/141 |
| 4,810,741 | 3/1989 | Kim | 524/405 |
| 4,820,345 | 4/1989 | Berg et al. | 106/18.12 |
| 4,871,694 | 10/1989 | LeGare | 501/39 |
| 4,873,146 | 10/1989 | Toussaint et al. | 252/606 X |
| 4,956,217 | 9/1990 | Heitkamp | 428/116 |
| 4,997,694 | 3/1991 | LeGare | 428/71 |
| 5,194,087 | 3/1993 | Berg | 106/18.12 |
| 5,250,580 | 10/1993 | Parsonage et al. | 521/110 |

FOREIGN PATENT DOCUMENTS

| | | | |
|---|---|---|---|
| 50-55616 | 5/1975 | Japan | 106/18.12 |

*Primary Examiner*—Richard D. Lovering
*Attorney, Agent, or Firm*—Young & Basile, PC

[57] ABSTRACT

A fire resistant, acoustic and thermally insulative product consists essentially of a silica-containing refractory solid in finely divided or powdered particulate form, present in an amount sufficient to intumesce to a predetermined volume when exposed to a predetermined amount of heat. The product further consists essentially of an aqueous sodium silicate solution present in an amount sufficient to act as an agent in producing a foaming process whereby the finely divided solid is so bonded as to form a cellular structure. The product produces substantially no toxic fumes or gases upon exposure to excessive heat or fire.

A process for producing the product comprises the steps of mixing silica sand and a sodium silicate solution at a predetermined weight ratio of sand to solution; placing the mixture in a mold at a predetermined mold depth; and placing the mold in a furnace at a temperature sufficient to facilitate foaming, and for an amount of time sufficient to increase the volume of the mixture to a predetermined volume, thereby forming a fire resistant product which is a lightweight, porous material comprising millions of small, closed cells.

10 Claims, No Drawings

PROCESS AND PRODUCT FOR PROVIDING FIRE RESISTANCE AND ACOUSTIC AND THERMAL INSULATION

BACKGROUND OF THE INVENTION

The present invention relates generally to a process and product for providing fire resistance and acoustic and thermal insulation, and more particularly to such a process which is non-toxic, rendering a product which is non-toxic and durable.

It is common knowledge that the majority of commercial buildings have false or suspended ceilings in them. The service piping, ducting, wiring and lighting installations in these buildings are either attached to, or hung above these ceilings. Generally, these false ceilings are made of acoustic tiles fitted on prepared metal frames. Aside from their obvious use in providing a nice looking ceiling, these tiles are sound absorbing and therefore formed from a noise reducing material. Most building codes dictate that these noise reducing materials have a specified sound absorbing coefficient, as well as being safe in cases of fire hazards. It is desirable and/or mandated that acoustic ceiling tiles resist fire and its spread; and that, in the presence of fire, they do not produce any toxic gases or suffocating fumes. The absence and/or reduction of such gases or fumes could help to save human lives, as most statistics show that suffocation is the main reason for death in cases of fire.

For the same reasons, materials used as heat insulation in commercial buildings and residences should also be fire resistant and, in the presence of fire, not produce any toxic gases or suffocating fumes.

Thus, it is an object of the present invention to provide a fire resistant product which is safe to prepare and use, posing virtually no polluting or toxic hazards, even when exposed to flames. It is a further object of the present invention to provide such a product which may be substituted for acoustic materials which fail to provide safety in cases of fire hazards, such as acoustic materials prepared from organic fiber, cork, or the like. Still further, it is an object of the present invention to provide such a product which is a heat insulator. Yet still further, it is an object of the present invention to provide such a product which may optionally be resistant to water. It is a further object to provide such a product which is easy to cut and bore, offering no mentionable resistance to both, which makes it easy to manage and install.

SUMMARY OF THE INVENTION

The present invention addresses and solves the above-mentioned problems and meets the enumerated objects and advantages, as well as others not enumerated, by providing a product for providing fire resistance and acoustic and thermal insulation, consisting essentially of a silica-containing refractory solid in finely divided or powdered particulate form, present in an amount sufficient to intumesce to a predetermined volume when exposed to a predetermined amount of heat. The product further consists essentially of an aqueous sodium silicate solution present in an amount sufficient to act as an agent in producing a foaming process whereby the finely divided solid is so bonded as to form a cellular structure. The product produces substantially no toxic fumes or gases upon exposure to excessive heat or fire.

A process according to the present invention for providing a fire resistant, acoustic and thermally insulative product, comprises the steps of mixing silica sand and a sodium silicate solution at a predetermined weight ratio of sand to solution; placing the mixture in a mold at a predetermined mold depth; and placing the mold in a furnace at a temperature sufficient to produce foaming, and for an amount of time sufficient to increase the volume of the mixture to a predetermined volume, thereby forming a fire resistant product which is a lightweight, porous material comprising millions of small, closed cells, which product releases virtually no toxic fumes or gases upon exposure to excessive heat or fire.

DETAILED DESCRIPTION OF THE PREFERRED EMBODIMENTS

The product for providing fire resistance and acoustic and thermal insulation according to the present invention consists essentially of a silica-containing refractory solid in finely divided or powdered particulate form, preferably having a mesh size ranging between about 40 microns and about 70 microns. Such high temperature refractory solid may be selected from the group consisting of silica sand, fire clay (not as preferred), similar silica-containing high temperature refractories, and mixtures thereof. In the preferred embodiment, silica sand ($SiO_2$) is used. $SiO_2$, which is colorless and generally insoluble in water, is in the form of finely divided material with a somewhat high degree of purity, eg. about 98%. The other 2% may contain oxides selected from the group consisting of aluminum oxide ($Al_2O_3$), magnesium oxide (MgO), potassium oxide ($K_2O$), calcium oxide (CaO), and mixtures thereof. It is to be understood that the remaining 2% may contain one or all of the above-mentioned oxides, in varying proportions.

The product for providing fire resistance and acoustic and thermal insulation according to the present invention further consists essentially of a sodium silicate solution. It is to be understood that many comparable silicates, whether in anhydrous or hydrated form, and whether in dry or solution form, may be used in accord with the present invention. Some suitable non-limitative examples include sodium metasilicate, sodium metasilicate pentahydrate, sodium tetrasilicate, and sodium orthosilicate.

In the preferred embodiment, solid sodium silicate ($Na_2O.SiO_2$), which is soluble in water, is used. The sodium silicate is dissolved in water to form an aqueous solution, with the preferred range of solid sodium silicate being about 46%±8% of the solution. It is to be understood that the sodium silicate may also be used in aqueous form ($Na_2Si_4O_9.H_2O$) (which is also soluble in water), as well as in the form of an aqueous colloidal suspension. Many variations of this solution exist, depending on the weight ratio between the $SiO_2$ and the $Na_2O$. In the preferred embodiment, the solution used has a weight ratio of $SiO_2$ to $Na_2O$ of about 2.40. Use of other weight ratios of $SiO_2$ to $Na_2O$, ranging between about 1.60 and about 3.75, are also contemplated as within the scope of the present invention, after adjustment of the proportions of the mixture of the $SiO_2$ and the sodium silicate solution before putting in a furnace.

The product for providing fire resistance and acoustic and thermal insulation according to the present invention may optionally further consist essentially of some coloring additives in very small quantities, for example, between about 0.30% and about 1.00%. If desired, a small quantity (between about 5% and about 10%) of silicate based glazing compounds may optionally be added with some metal oxides. It is to be understood that any suitable glazing compound may be used. However, in the preferred embodiment, the silicate based glazing compound is selected from the group consisting of sodium aluminum silicate, potassium aluminum silicate, and mixtures thereof. Upon exposure to an open flame of a high temperature, preferably between about 500° C. and about 600° C., the surface may be glazed either for better appearance, or for partially sealing the back surface of the inventive acoustic material in order to enhance sound attenuation properties.

The process for providing a fire resistant and acoustic and thermal insulative product according to the present invention comprises the step of mixing the $SiO_2$ powder and the sodium silicate solution at a predetermined ratio (by weight) of $SiO_2:Na_2O.SiO_2$. In the preferred embodiment, this ratio is about 1:3.80. It is mainly composed of silica sand as its main constituent (more than about 80%).

The process further comprises the steps of placing the mixture in a mold at a predetermined depth, preferably at a depth of up to about ⅓ the mold depth); and then, placing the mold in a furnace at a temperature sufficient to facilitate foaming; and for an amount of time sufficient to increase the volume of the material to a predetermined volume.

In the preferred embodiment, the furnace temperature is about 350° C. (662° F.); and the amount of time in the furnace is about 2.50 hours to 3 hours. Foaming takes place at this temperature, and there is approximately a three-fold increase in the volume of the material originally deposited in the mold. There is also about a 50% decrease in the total weight—it is believed that the loss in weight is due to the loss of water present in the solution.

The material in the mold is then cooled (it is preferred that sudden cooling be avoided), and then the material is removed from the mold.

The product formed by the process of the present invention is a lightweight, porous material composed of millions of small, closed cells. Without being bound to any theory, it is believed that these closed cells make the present inventive product a very good sound absorbant and heat insulator. It is believed that sound waves are trapped in the inventive product, reverberating between the closed cells, and consequently changing the energy to heat. If the surface of the molded inventive product is painted or coated, then artificial perforations and fissures of different diameters may have to be formed to accommodate sound waves of various lengths, hence frequencies.

It is believed that variations in the proportions used (solid $SiO_2$ to liquid $Na_2O.SiO_2$) in the present inventive mixture will determine the outcome. For making material more dense than 17 lb/ft³, the amount of solid ($SiO_2$ powder) may be increased. The expansion in volume due to foaming will then decrease, and the resulting material will be more denser and have a higher compressive strength. A product having these characteristics may be more desirable for some applications whose primary purposes are other than maximum sound absorption and/or maximum heat insulation. However, optimal fire resistance will still be achieved with this denser material.

The description hereinabove is exemplary of how the present inventive product/material may have a wide range of uses by varying one or all of: the proportion of solid to liquid; the time in the furnace; and the like. These variations may improve one property/characteristic of the material at the expense of the other (depending on the desired characteristics dictated by the particular end use). However, it is to be understood that no matter what characteristics the resulting material has, that material will be fire resistant, and no toxic gases or fumes will be emitted upon exposure to excessive heat and/or flame.

For example, when a 1:2.50 proportion (solid $SiO_2$ to liquid $Na_2O.SiO_2$) was used, the resulting density increased to about 23 lb/ft³, resulting in about a 35% increase in the density and an increase of about 15% in the compressive strength. The increase in the coefficient of thermal conductivity was in the range of 7%, while there was no marked effect on the coefficient of sound absorption.

Another example is that when using a proportion of 1:5 (solid $SiO_2$ to liquid $Na_2O.SiO_2$), the resulting material had a density of 14 lb/ft³ with improved properties in heat resistance, but a decrease in compressive strength.

It is to be understood that the material of the present invention may be formed in any suitable shape and/or size and/or thickness, depending upon the particular end use. The present inventive material is easy to cut and bore, and offers no mentionable resistance to both, which advantageously makes it easy to manage and install. In the preferred embodiment, the present inventive material may be used as tiles for acoustic purposes, which tiles may have various dimensions, eg. 60 cm by 30 cm; 80 cm by 40 cm; and the like. The thickness may be between about 20 mm and 25 mm (¾"–1"). The material from the mold may also be 5 cm thick and then cut in half. For heat insulation purposes, thicknesses of 5 cm or more can be produced with dimensions of 60 cm by 30 cm; 80 cm by 40 cm; and the like.

In its capacity as a sound absorbant, the product according to the present invention is light in weight, fire resistant, and has a very good coefficient of sound absorption. This decreases reverberation in the environment in which it is used, and thus reduces noise levels.

It is to be understood that various types of paints or coatings with perforations may be applied to the product's surfaces for decorative purposes. For limiting sound transmission and energy, the back surface of the inventive product may be covered with any suitable foil, and/or coated with any suitable coating material.

Furthermore, it is to be understood that the surface of the present product may be treated in many ways, as desired and/or as dictated by a particular end use. For example, in its capacity as a light, fire resistant material, the faces can be neatly plastered with a coat of gypsum or plaster of paris for use as strong, light, fire resistant partition walls. Also in the same capacity, 5 cm thick slabs may be laid on wooden floor systems, and, after covering them with a layer of gypsum or any other material for very smooth surfacing, fitted carpets may be laid on the thus prepared floor. The wooden floor will be heat insulated and protected from the hazard of fire starting or propagating from the fitted carpet material. Also, when using the more dense material described hereinabove, fire resistant doors may be made by sandwiching the material between the wooden planks of which the door is made.

The surfaces of the present inventive product may also be plastered and finished using a mixture of portland cement and sand to get a strong and light slab with improved heat insulating properties. This slab may be used for roofing, partitioning, and the like. As such, in its capacity as a heat insulating material, the present product may be used almost anywhere insulation is necessary and/or desired. By the uses of a vapor barrier on the appropriate surface, the present product may also be used in refrigeration, and cold storage (the composition showed no signs of any contraction cracks or signs of any distress after putting it in a temperature of −28° C.).

The present invention advantageously retains its thickness for an indefinite period of time, unlike some other heat insulating materials that may have superior thermal conductivity coefficients but lose their thickness and deteriorate over time, thus needing replacement. Further, in most cases, these materials having superior thermal conductivity coefficients are not fire resistant and produce toxic and suffocating gases upon exposure to excessive heat and/or flame.

In an alternate embodiment of the present invention, different diameter spheres with low density having the same characteristics as the inventive product described hereinabove may be obtained by putting the mixture of the solid and the liquid in semi-spherical depressions formed in trays. The material will foam into a complete closed sphere. Inside the sphere, the same kind of closed cells are found as described above. As one example, these spheres may be used as light, heat insulating, fire resistant filler material in making gypsum boards.

To further illustrate the composition, the following example is given. It is to be understood that this example is provided for illustrative purposes and is not to be construed as limiting the scope of the present invention.

EXAMPLE

Solid $SiO_2$ was mixed with liquid $Na_2O.SiO_2$ in a ratio of 1:3.8 (solid to liquid). The mixture was placed into a mold, and the mold was placed in a furnace at 350° C. (662° F.) for 2.50 hours to 3 hours. The resulting material was a lightweight, porous material composed of millions of small, closed cells. The material was tested and was found to have a coefficient of sound absorption of 0.71. Thermal conductivity was 0.074 W/(m·K) or 0.5 Btu·in/h·ft²·°F. Density was 17 lb/ft³. Compressive strength (not flexural) was 75 psi.

The material was exposed to a gas flame for a period of 30 minutes, during which time it neither burned nor caught any flame, and no gases were released. The material did become red hot; and the points in contact with the fire showed signs of some glazing, probably due to the presence of some potassium aluminum silicate in the $SiO_2$ powder in the shape of impurities.

The material was further shown to be resistant to water. Upon immersing it in water for 48 hours, the water was found to have no effect upon it.

While preferred embodiments, forms and arrangements of parts of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A product for providing fire resistance and acoustic and thermal insulation, consisting of:

a silica-containing refractory solid in finely divided or powdered particulate form, present in an amount sufficient to intumesce to a predetermined volume when exposed to a predetermined amount of heat; and an aqueous sodium silicate solution present in an amount sufficient to act as an agent in producing a foaming process whereby the finely divided solid is so bonded as to form a cellular structure, wherein the sodium silicate solution consists essentially of $SiO_2$, $Na_2O$ and water, and wherein the weight ratio of $SiO_2$ to $Na_2O$ is about 2.40;

wherein the product produces substantially no toxic fumes or gases upon exposure to excessive heat or fire.

2. The product as defined in claim 1 wherein the predetermined amount of heat is approximately 350° C.

3. The product as defined in claim 1 wherein the silica-containing refractory solid is $SiO_2$.

4. The product as defined in claim 1 wherein the ratio of silica-containing refractory solid to sodium silicate solution is approximately 1:3.80.

5. A process for providing a fire resistant, acoustic and thermally insulative product, comprising the steps of:

mixing silica sand and a sodium silicate solution at a predetermined weight ratio of sand to solution;

placing the mixture in a mold at a predetermined mold depth; and placing the mold in a furnace at a temperature sufficient to facilitate foaming, and for an amount of time sufficient to increase the volume of the mixture to a predetermined volume, thereby forming a fire resistant product which is a lightweight, porous material comprising millions of small, closed cells, which product releases virtually no toxic fumes or gases upon exposure to excessive heat or fire.

6. The process as defined in claim 5, further comprising the steps of:

gradually cooling the product in the mold; and removing the product from the mold.

7. The process as defined in claim 5 wherein the mixture is placed in the mold at a depth of up to about ⅓ the mold depth, and wherein the furnace temperature is about 350° C. (662° F.).

8. The process as defined in claim 7 wherein the amount of time in the furnace is between about 2.50 hours and 3 hours.

9. The process as defined in claim 8 wherein the predetermined weight ratio of sand to solution is approximately 1:3.80.

10. The process as defined in claim 9 wherein the wherein the sodium silicate solution consists essentially of $SiO_2$, $Na_2O$ and water, and wherein the weight ratio of $SiO_2$ to $Na_2O$ is about 2.40.

* * * * *